July 13, 1937.  A. T. HARRIS  2,086,549
SHAFT COUPLING
Filed June 5, 1936   3 Sheets-Sheet 3
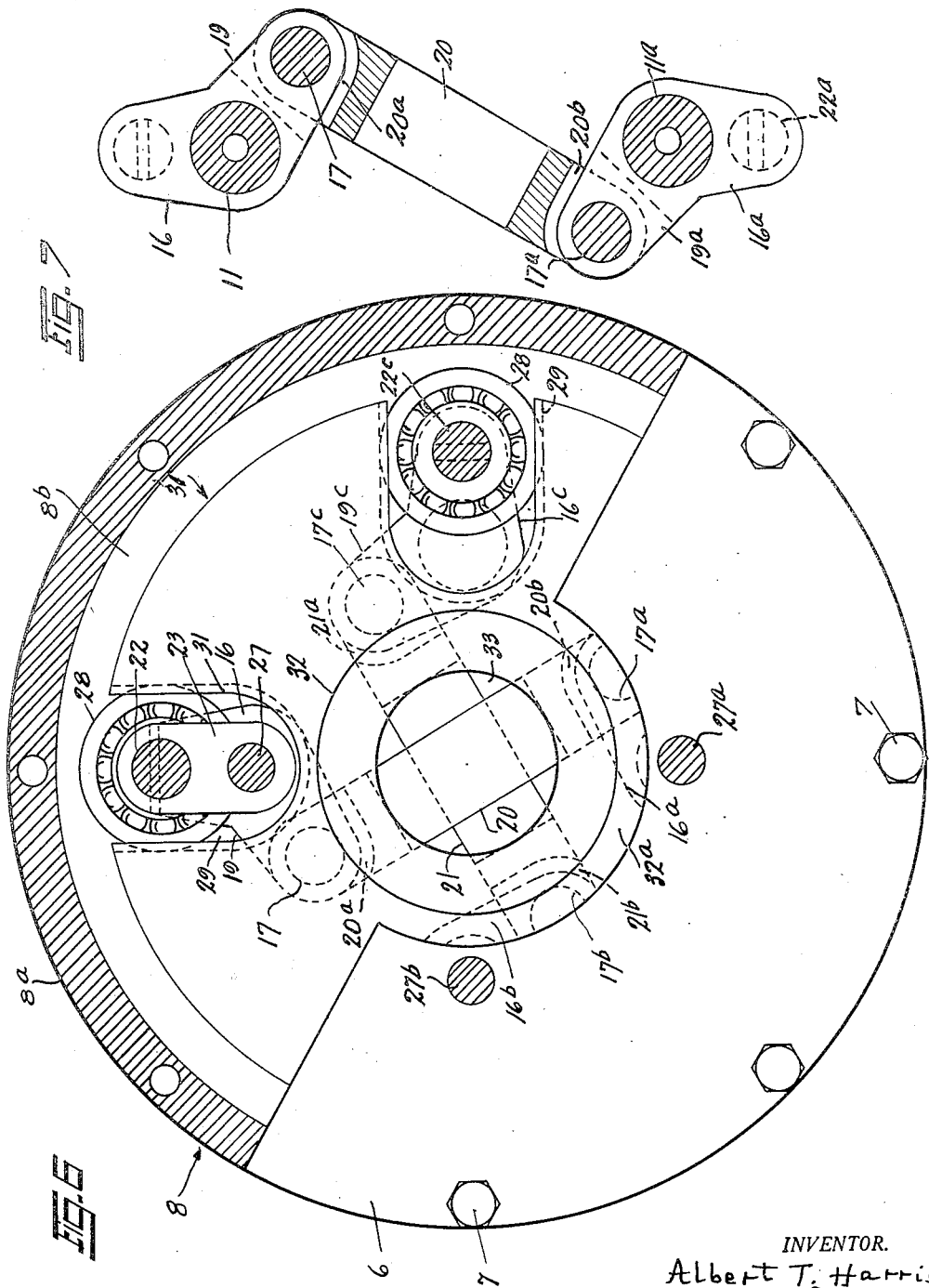
INVENTOR.
Albert T. Harris
BY
ATTORNEYS.

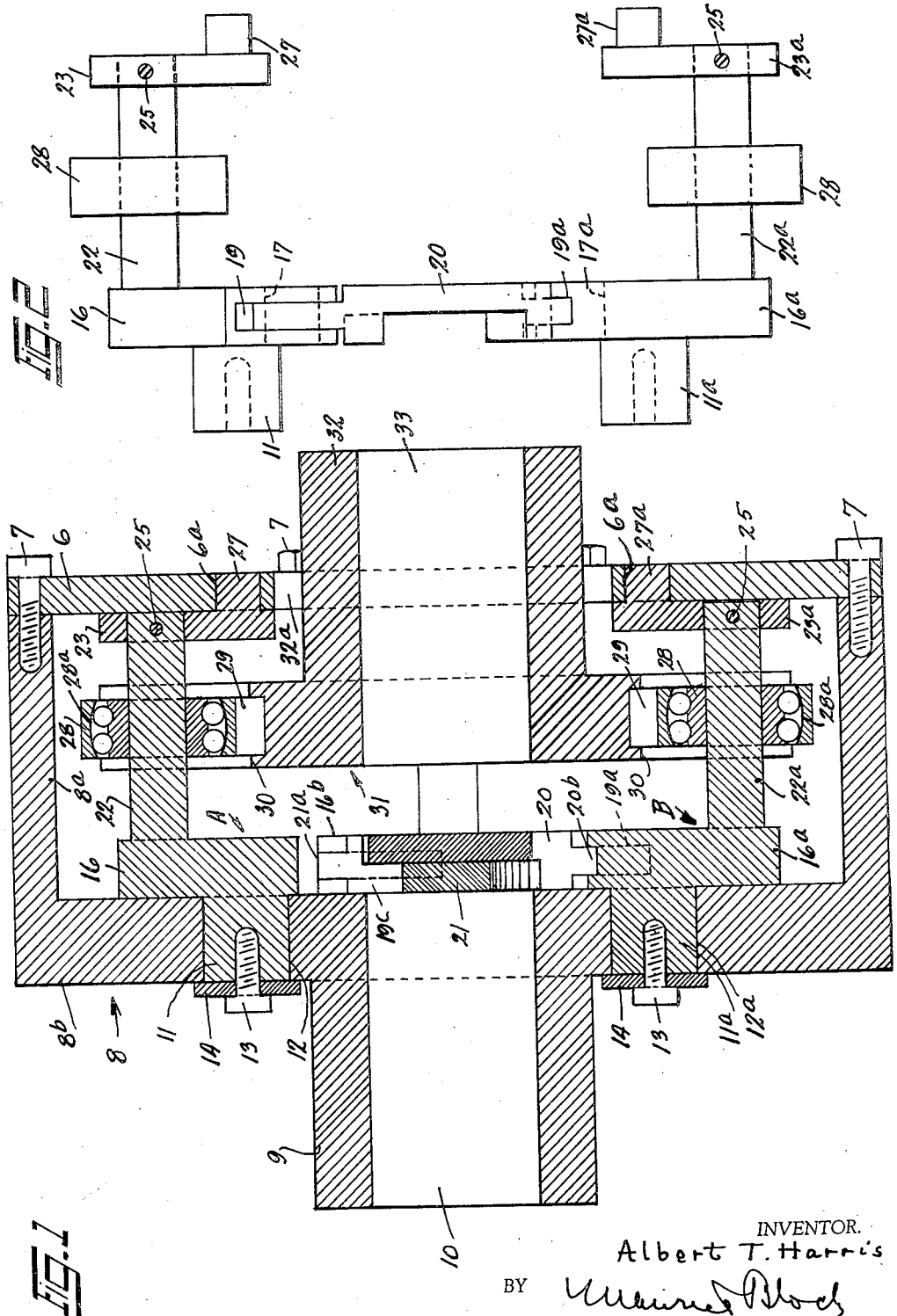

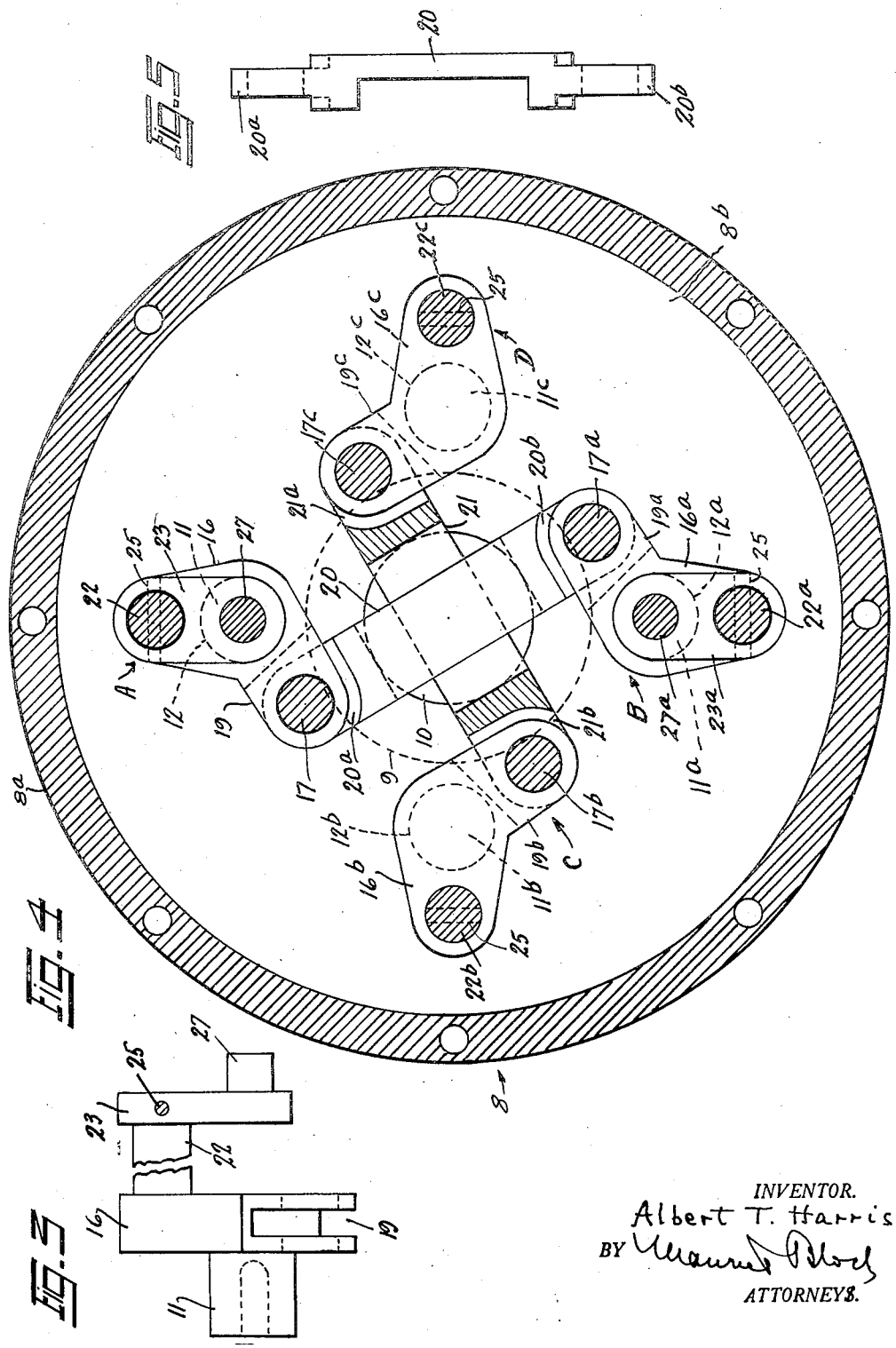

Patented July 13, 1937

2,086,549

UNITED STATES PATENT OFFICE 2,086,549

SHAFT COUPLING

Albert T. Harris, New York, N. Y., assignor, by direct and mesne assignments, to Harris Coupling Co., Inc., a corporation of New York Application June 5, 1936, Serial No. 83,619

6 Claims. (Cl. 64—6)

This invention relates to shaft couplings and has for one of its objects the provision of such a device which when used to couple or join two shafts, the said shafts will run or rotate just as freely when out of alignment as they would rotate when in absolute alignment.

Another object of the invention is the provision of a device of this character which will accommodate or adjust itself to any change within given limits of the relative positions of the two shafts which it connects.

A further object of the invention is the provision of such a coupling which will be just as effective for coupling two shafts which are out of alignment but whose center lines cross, as for shafts which are out of alignment but the centers of which are parallel to each other.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a sectional view of a preferred form of my improved coupling;

Fig. 2 is a side view in elevation of one set of self-aligning bearings and bell crank assembly used in connection with my improved coupling;

Fig. 3 is a fragmental side elevation of a portion of the bell crank mechanism;

Fig. 4 is a sectional view looking from the right of Fig. 1 with certain parts omitted from the section;

Fig. 5 is a side view in elevation of the bell crank connecting link;

Fig. 6 is an end view of the coupling partly broken away and looking from the right of Fig. 1; and Fig. 7 is an end view partly in section of one pair of bell cranks and their connecting link.

Referring now to the drawings in detail, 8 indicates the coupling housing or casing having an annular, substantially high wall or flange 8a which may be closed at one end thereof by a cover plate 6 secured to the wall 8a by means of screws 7. The housing 8 is provided at the side opposite the plate with a centrally located hub 9 having a shaft-receiving bore or opening 10 therein, the hub 9 being integral with the rear wall 8b of the housing 8. The wall 8b has four holes marked respectively 12, 12a, 12b and 12c to receive the pins 11, 11a, 11b, and 11c which respectively are connected or are integral with bell crank levers A, B, C and D. The pivot or pin portions 11, 11a, 11b and 11c are maintained in place in their respective openings by means of screws 13 and washers 14, the said screws being threaded into openings 15 in the pins.

The bell cranks A, B, C and D are all identical and comprise respectively arms 16 and 19, 16a and 19a, 16b and 19b and 16c and 19c, the lever arms 19 and 19a being bifurcated and connected to a link 20 by means of pins 17 and 17a and the bifurcated arms 19b and 19c are connected to links 21 by means of pins 17b and 17c. The link 20 is provided with a pair of reduced portions 20a and 20b to fit respectively into the bifurcated arms 19 and 19a and the link 21 is provided with similar portions 21a and 21b to fit into the arms 19c and 19b. Secured or forming integral parts with the respective bell crank arms 16, 16a, 16b and 16c are short shafts 22, 22a, 22b, and 22c which shafts have secured at their free ends levers 23, 23a, 23b, and 23c which are all identical and which are provided with openings 24 to receive the said shaft ends, the securing means being pins 25. The arms or levers 23, 23a, 23b and 23c are all pivotally mounted by means of extensions 27, 27a, 27b and 27c which fit respectively into openings 6a in the cover plate 6.

Each of the shafts 22, 22a, 22b and 22c carries a self-aligning ball-bearing roller 28 with an inner arcuate bearing surface 28a. The said roller bearings fit into slots 29 in a coupling member 31 having side guides 30 to prevent the said rollers from coming out sidewise from the slots into which they fit. The coupling member is provided with a hub or boss 32 which extends through a central opening 32a in the plate 6 and is further provided with a shaft receiving bore or opening 33.

The operation of the device is as follows: Power is applied to the housing 8 by the shaft which fits into the opening 10 therein, the said power being transferred to the coupling member 31 through the plate 6 and connections 16, 22, 23 and 27 and through the similarly numbered connections marked with the coefficients a, b, c and d.

If we assume that the driven shaft which fits into the opening 33 of the coupling member 31 becomes misaligned with the drive shaft and moves either to the right or left of the center shown in Figs. 4 and 6, then the slots in the coupling member 31 will actuate the rollers 28 on the shafts 22 and 22ª to swing the bell cranks A and B into proper position so that the two coupling members rotate in unison without any added friction. The same action takes place if the two shafts are in misalignment vertically the only difference being that the swinging action is on the bell cranks 16$^b$ and 16$^c$. If the misalignment is both up or down and sidewise, the compensating movement is on all of the bell cranks.

In cases where the driven shaft becomes tilted with respect to the drive shaft then the rollers 28 on the shafts will have a sliding movement on their respective shafts, some towards and others away from the plate 6 until they find their position corresponding to the altered angular position of the driven shaft.

The coupling is so constructed, that the result of travel, multiplied by the force exerted on one side of the center of the variable coupling member is the same as the result of the same factors on the opposite side of the said center, regardless of the position it assumes with respect to the non-variable coupling member within given limits.

From the foregoing, it will be seen that I have provided a highly efficient shaft coupling which will accommodate itself to any relative change in position, angularly or radially of the two shafts which it connects.

Having described my invention, what I claim as new and desire to secure by Letters Patent is:

1. A shaft coupling, comprising a pair of coupling members, means connecting the said coupling members, the said means comprising two pairs of bell-crank connecting units pivotally mounted on opposite sides of the center of one of the coupling members, each connecting unit comprising a bell-crank lever pivotally mounted on one side of one of the coupling members, a lever arm spaced from the bell-crank lever and pivotally mounted on the other side of the said coupling member, a shaft connecting the bell-crank lever and second mentioned lever arm, a self-aligning bearing slidably carried by the said shaft in operative engagement with the other of said coupling members, and a link connecting each pair of oppositely disposed bell-cranks.

2. A shaft coupling, comprising a hollow housing having a shaft-receiving opening at one end thereof, a centrally perforated plate secured to the opposite end of the housing, two pairs of connecting units comprising four bell-crank levers spaced ninety degrees apart and pivotally mounted on the housing, four lever arms pivotally mounted on the plate in alignment with the bell-crank levers, a shaft connecting each bell-crank to its complementary lever arm, a self-aligning roller bearing slidable on each of the shafts, a link connecting each pair of oppositely disposed bell-crank levers, and a second coupling member in operative engagement with the roller bearings.

3. A shaft coupling, comprising a hollow housing having a shaft-receiving opening at one end thereof, a centrally perforated plate secured to the opposite end of the housing, two pairs of connecting units comprising four bell-crank levers spaced ninety degrees apart and pivotally mounted on the housing, four lever arms pivotally mounted on the plate in alignment with the bell-crank levers, a shaft connecting each bell-crank to its complementary lever arm, a self-aligning roller bearing slidable on each of the shafts, a link connecting each pair of oppositely disposed bell-crank levers, and a second coupling member having slots therein, the said slots being in sliding engagement with the roller bearings.

4. A shaft coupling comprising a pair of coupling members, a pair of oppositely disposed bell-cranks pivotally mounted on one of the coupling members, one on each side of the center of the said coupling member, a link connecting one end of each bell-crank, and a self-aligning bearing carried at the opposite end of each of the bell cranks in sliding engagement with the other coupling member.

5. A shaft coupling comprising a pair of coupling members, a pair of oppositely disposed bell-cranks pivotally mounted on one of the coupling members, one on each side of the center of the said coupling member, a link connecting one end of each bell-crank, a second pair of connected, oppositely disposed bell-cranks pivotally mounted on the said coupling member at right angles to the first pair, and a self aligning bearing carried by each of the bell-cranks at their free ends in sliding engagement with the other coupling member.

6. A shaft coupling, comprising a pair of coupling members, means connecting the said coupling members, the said means comprising two pairs of bell-crank connecting units pivotally mounted on opposite sides of the center of one of the said coupling members, the said units each including a bell-crank lever, a link connecting oppositely disposed bell crank levers at one end, and a self-aligning roller carried by each bell-crank lever at its free end in sliding engagement with the other of the said coupling members.

ALBERT T. HARRIS.